UNITED STATES PATENT OFFICE.

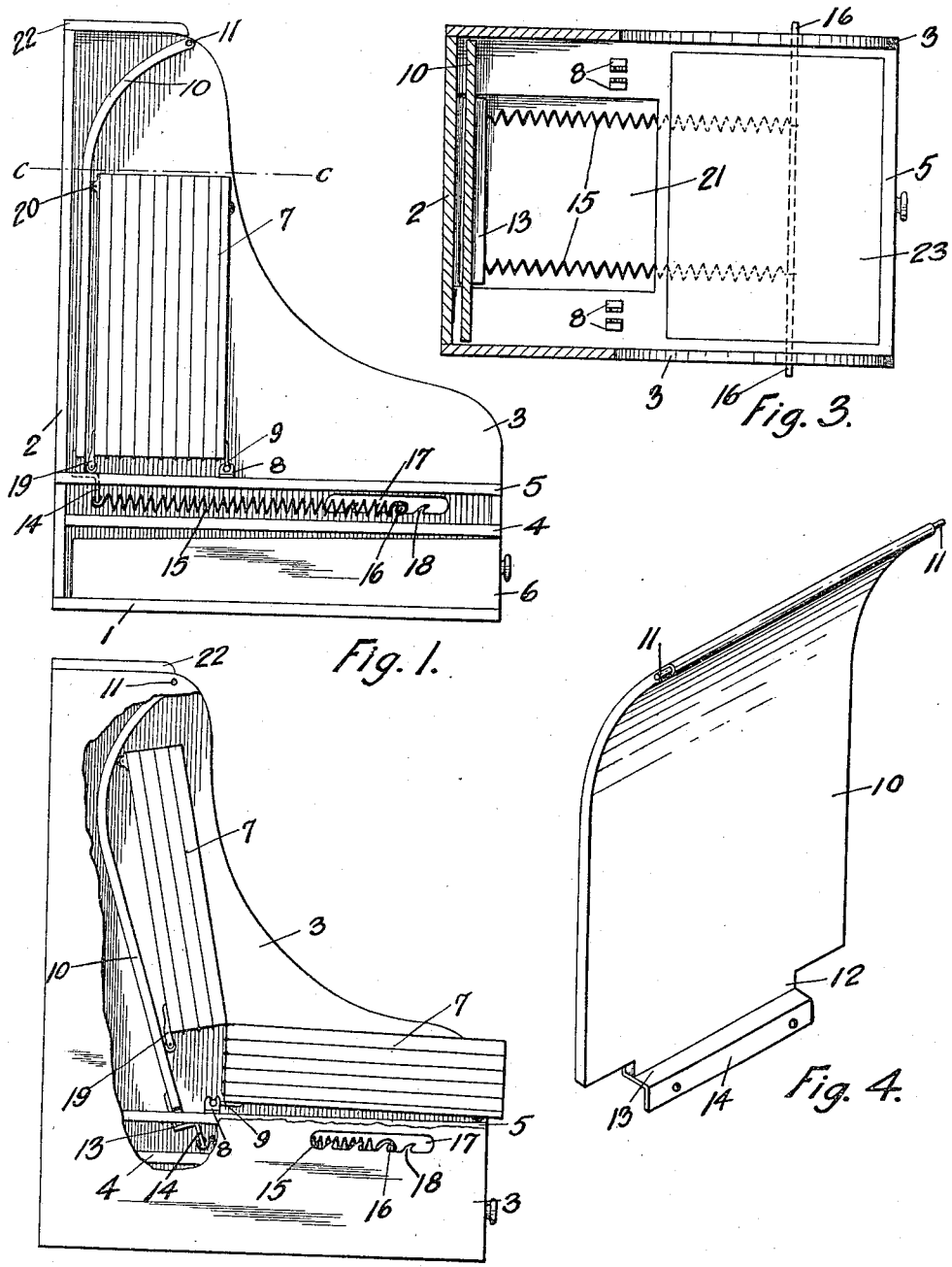

FRANK E. LIVERANCE, JR., OF GRAND RAPIDS, MICHIGAN, ASSIGNOR, BY MESNE ASSIGNMENTS, TO THE McCASKEY REGISTER COMPANY, (INCORPORATED IN 1914,) OF ALLIANCE, OHIO, A CORPORATION OF OHIO.

FILING APPLIANCE.

1,195,168.      Specification of Letters Patent.      Patented Aug. 15, 1916.

Application filed July 2, 1913. Serial No. 777,080.

*To all whom it may concern:*

Be it known that I, FRANK E. LIVERANCE, Jr., a citizen of the United States, and resident of Grand Rapids, in the county of Kent and State of Michigan, have invented a new and useful Filing Appliance, of which the following, taken in connection with the accompanying drawings, is a specification.

This invention relates to that type of filing appliance in which a series of leaves are pivoted together, normally occupying an upright position but adapted to be successively, or collectively, wholly or in part, placed in prone position that access may be had to either side of any leaf for placing or removing sales account slips on the leaves. And it is an object of this invention to provide means facilitating the operation of the leaves in a simple and efficient manner, producing a structure of few parts and low cost of manufacture, and otherwise producing desirable and serviceable improvements as will be apparent as the description progresses, reference being had to the accompanying drawings in which, Figure 1 is a side elevation of the filing leaves and cabinet, one side of the cabinet being removed. Fig. 2 is a similar view the side of the cabinet being partially broken away, and part of the leaves being shown in prone position. Fig. 3 is a view taken on the line c—c, Fig. 1, looking down on the cabinet, the filing leaves being removed. And Fig. 4 is a perspective view of the pivoted follower located behind the leaf pack.

Similar reference numerals refer to similar parts throughout the several views.

In the embodiment of my invention as shown, a filing casing or cabinet of usual construction is used, having a base 1, back 2, and sides 3. Positioned horizontally some distance above the base 1 are a pair of spaced apart partitions or floors 4 and 5, the usual drawer that accompanies this type of filing cabinet being placed between the lower partition 4 and the base 1, denoted in the drawings by numeral 6. The filing leaves 7 are pivoted together at their lower edges as shown in Fig. 1, and the front leaf is pivoted to the fixed bearing members 8 which are attached to the upper side of partition 5, by means of the members 9. Members 9 are readily removable from bearings 8 so that the pack of leaves as a whole may be easily removed from the casing when desired.

A curved follower 10 is pivoted by means of pivots 11 extending each side thereof at the upper end to the casing, pivots 11 entering openings in the sides 3 of the casing. The point of pivotal attachment is above the forward leaves of the pack, from which point the follower is curved backward and downward until it passes behind the rear leaf of the pack, the follower for the rest of its length being straight and parallel to the upright leaves as shown in Fig. 1. The follower is of a width substantially equal to the distance between the sides 3 except at its lower end where portions are cut away on both sides leaving the narrower part 12, to which is attached the Z-plate 13. This plate terminates in the downwardly projecting portion 14, which is perforated, the perforations each receiving one end of a coiled spring 15, the other end of which is attached to rod 16 passing between and through slots 17 in the sides 3 of the casing. There are two springs 15 shown but the number may be varied at will. The slots 17 are formed with a series of upwardly projecting prongs or lugs 18 behind which the rod 16 engages, and the rod may be shifted at will to increase or decrease the tension of the springs. Bearings 19 and 20 are located at the bottom and top respectively of the rear side of the rear leaf, each bearing carrying rollers which engage against the follower 10 when any of the leaves are in prone position, the rollers on parts 19, however, resting on the horizontal portion of Z-member 13 when all the leaves are in upright position. The partition or floor 5 is cut away to form a rectangular opening 21 through which the part 12 projects and in which parts 12 and 13 move, the springs 15 being located between the floors 4 and 5.

A top 22 is provided for the casing above the follower, and the usual index 23 is located at the usual place in front of the leaf pack.

The operation of the structure described will be readily apparent.

When the leaves are all in upright position, the lower rollers on the rear leaf will rest on horizontal part of member 13 and the springs 15 will be under their greatest tension. As parts 19 extend some distance below the lower edge of the rear leaf, there will be a force exerted on the leaves tending to keep them in upright position, such force not being of sufficient amount but that it may be easily overcome. It however will insure against accidental dropping of any of the front leaves. When access to any leaf is desired, as many leaves as is necessary may be turned to prone position as in Fig. 2. When a number of the leaves are turned down, those remaining in upright position will be elevated as shown in Fig. 2, and the lower end of the follower 10 will move forward turning about pivots 11. The spring exerting a force on the follower will draw it forward and as the straight portion of the follower will be at an incline with the vertical, there will be a vertical component of this force tending to lift the remaining upright leaves. This is a desirable feature as in the usual gravity type of file leaf pack, the whole power lifting the upright leaves must come from the operator of the device. The upper ends of the upright leaves will follow along the follower 10 taking bearing against the curved portion thereof, but not until they are tilted backward at a slight incline. A small backward inclination is desirable there being no danger then that a leaf will accidentally fall forward. Too great an inclination is objectionable however, on account of the difficulty of seeing the account slips, and this objection is obviated by the curved upper end of the follower which carries the upper ends of the upright leaves forward as their elevation forces them along the curved path.

It will also be noted that the tension of the springs 15 decreases with the smaller number of leaves left in upright position and that accordingly the vertical lifting component will decrease with the less weight to be elevated.

While I have shown a complete and practically operative device, the invention is not to be considered as limited to the precise structure shown and described. The disclosure is to be taken as diagrammatic and illustrative of the invention and as in no sense limiting, the invention itself including all modifications falling within the scope of the appended claims.

Having thus fully described the invention, what I claim as new and desire to secure by Letters Patent is,—

1. In a filing appliance, a case, a series of leaves mounted in the case to swing from vertical to horizontal positions in the case and vice versa, a follower pivoted a distance beyond the free ends of the leaves extending along and engaging with a leaf of the leaf pack, and means forcing the follower into engagement with the said leaf.

2. In a filing appliance, a casing, a series of leaves mounted in the casing to swing from a vertical to a horizontal position and vice versa, a follower pivoted to the casing beyond the free ends of the leaves, and extending along and engaging with a leaf, means to force the follower into engagement with the said leaf and means to vary the force acting on the follower.

3. In a filing appliance, a casing, a series of leaves mounted in the casing to swing from a vertical to a horizontal position and vice versa, a follower pivoted to the casing beyond the free ends of the leaves and engaging with a leaf of the leaf pack, means forcing said follower against said leaf, and means to cause the force to lessen in intensity as one or more of the leaves are operated to horizontal position.

4. In a filing appliance, a case, a series of leaves mounted in the casing to swing from vertical to horizontal position in the case and vice versa, and a follower pivoted above and in front of the rear leaf of the series to the case and extending back of the leaves.

5. In a filing appliance, a case, a series of leaves mounted in the case to swing from vertical to horizontal position in the case and vice versa, a follower located back of the leaves and having its upper portion curved forwardly above the upper ends of the leaves, means pivoting the upper end of the follower to the case and means operating the follower into engagement with the rear leaf, substantially as described.

6. In a filing appliance, a case, a series of leaves mounted in the case to swing from vertical to horizontal positions in the case and vice versa, a follower located back of the rear leaf and pivoted to the case at its upper end, the lower end of said follower extending below the lower edges of the leaves, and spring means connected to the lower end of the follower and extending under the leaves, substantially as described.

7. In a filing appliance, a case, a series of leaves mounted in the case to swing from vertical to horizontal positions in the case and vice versa, a follower pivoted at its upper end to the case and extending back of the leaves, a member secured to the lower end of the follower including a horizontal portion extending forward from the follower on which the rear leaf is adapted to rest when all of the leaves are in vertical position, and yielding means engaging with said member tending to force the follower against the rear leaf, substantially as described.

8. In a filing appliance, a case, a series of leaves mounted in the case to swing from vertical to horizontal positions in the case and vice versa, a follower located back of the rear leaf of the series and pivoted to the case, means connected to the rear leaf and extending below the lower edge thereof, and means operating the follower into engagement with said means to thereby hold the rear leaf normally in upright position.

9. In a filing appliance, a case, a series of leaves hinged together at their lower edges and mounted in the case for movements from vertical to horizontal positions therein and vice versa, rollers connected to the rear leaf of the series and extending below the hinge connection of said leaf to the leaf next ahead, rollers connected to said leaf adjacent its upper edge, a follower pivoted to the case at its upper end and extending back of the leaves, said rollers engaging against the follower, and means for drawing the follower against the lower rollers to thereby hold the rear leaf in upright position with the upper rollers bearing against the follower.

In testimony whereof I hereunto affix my signature in the presence of two witnesses.

FRANK E. LIVERANCE, Jr.

Witnesses:
L. E. CORRAN,
J. W. WHEELER.

Copies of this patent may be obtained for five cents each, by addressing the "Commissioner of Patents, Washington, D. C."